UNITED STATES PATENT OFFICE.

SIMEON G. PHILLIPS, OF PERTH AMBOY, NEW JERSEY.

PREPARATION OF CLAY FOR THE MANUFACTURE OF POTTERY.

SPECIFICATION forming part of Letters Patent No. 235,014, dated November 30, 1880.

Application filed July 27, 1880. (No specimens.)

*To all whom it may concern:*

Be it known that I, SIMEON G. PHILLIPS, a citizen of the United States, residing at Perth Amboy, Middlesex county, in the State of New Jersey, have invented certain new and useful Improvements relating to the Preparation of Clay for the Manufacture of Pottery, of which the following is a specification.

My improvement is intended more especially for the fine clays used for the manufacture of American china, iron-stone, white granite, and analogous white or slightly blue or yellow ware for table sets and the like; but I believe it may be used to advantage in the treatment of other clays and for other purposes.

I have discovered a law not before recognized relating to the action of clay in its separation from fine foreign matter mingled therewith, and have devised an important improvement based thereon.

I have ascertained by extended experiments that in the treatment of heavy-bodied fine clay a particle of oxide of iron, iron pyrites, silica, or other solid matter associated with clay in the earth becomes so intimately united with a layer of fine clay lying immediately adjacent that they do not readily separate. The well-known process of washing thoroughly agitates all the parts of the clay, and reduces the greater portion of the clay to a thin liquid condition; but the particles of clay immediately adjacent to the iron, silica, &c., remain adhering. In this condition, obtained after ordinary washing, the foreign particles, with their considerable quantity of clay adhering, form a small lump, which is so nearly of the same specific gravity as the thinner clay around it that only the larger masses sink, and such masses sink slowly. They accumulate on the bottom in the form of a mass of refuse, of which the greater proportion is clay, with a small proportion of pyrites or other foreign matter. Even a prolonged soaking, without a subsequent washing, does not remove the last particles of clay surrounding a solid particle of other matter; but if the clay is first washed to remove all that is easily removed, then allowed to soak a long time in a quite fluid condition, and then washed again, the preliminary washing away of the free clay and the succeeding long soaking will be found to have so affected the clay immediately adhering to the foreign matter that on the final washing the clay will all be removed from the foreign matter and the foreign matter left naked in the fluid. Thus conditioned, even the very fine particles of foreign matter will sink when allowed to remain the ordinary time in the ordinary "floating-beds."

The nature of my invention consists in a certain succession of treatments: first, washing the clay, which may be done in the ordinary manner and by an ordinary washer; then allowing the washed material to stand a long time; (I have found one week to suffice, but three weeks or more will be better where the time can be afforded;) then washing again; and then letting the material flow slowly across a floating-bed to deposit the foreign matter, and then to stand in settling-tanks to deposit the clay.

I believe no drawings will be necessary to convey a full knowledge of the invention.

I can, if desired, soak the clay over night in the ordinary manner before the first washing. I prefer that the liquid from the first washing shall be in a condition nearly as thick as cream. If it is too thin it requires larger storage-tanks to hold a given quantity of clay, and involves increased expense in apparatus, an increased water-supply, and increased power for pumping; but it is very essential that it be not too thick. The success of my process depends on this material being thoroughly washed, and then on its lying in the condition of a fluid rather than in a pasty condition.

If the fluid is made very thin some of the foreign matter will sink while in the soaking, intermediate between the two washings; but I do not esteem it expedient to rely upon any separating there. I pump out the whole, sediment and all. I have in my experiments used six tanks, each about five (5) feet deep and thirteen (13) feet square, inside measurement. Each will hold a day's work. These tanks are filled and emptied in succession, so that the contents of each have stood a week. From these tanks the fluid, in a creamy condition, is, after its long soaking, pumped into the regular washer, where it is agitated with a liberal supply of pure water, and is discharged in the thin and milky condition suitable for being passed slowly over the floating-beds.

The treatment of the material after its emergence from the second washing is identical with the ordinary treatment of china-clays—that is to say, it is passed slowly over the floating-beds, where it is an hour or more in moving a thousand feet, and deposits its foreign particles, and is then received in capacious settling-tanks, where it stands absolutely at rest for twenty-four hours (more or less) and deposits its clay, allowing the clear water to be drained off and wasted or conducted around to be used again. The only difference in the treatment of my clay after the second washing is in the result. The sediment deposited in the floating-bed is not, as usual, an inferior quality of clay, but is composed almost entirely of the foreign matter.

After having passed over my floating-bed and recovered between three and four hundred tons of fine clay, I cleaned up the apparatus and took out only between three and four tons—about one per cent.—of foreign matter lodged in the bottom of the floating-bed. That is the whole of the waste, except the minute quantity passing off with the waste water. The clay from the bottom of the settling-tanks still holds large quantities of water. This is removed by pressing, under strong hydraulic pressure, through stout closely-woven cotton duck.

In the completest form of my invention a certain amount of chemical as well as mechanical action is induced to remove the fine iron particles. There is alum in the clay. The same water, which has become strongly impregnated with alum in the treatment of a lot of clay, is reserved and used for the first washing of another lot. Thus the soaking in the creamy condition between the first and second washing is effected in a fluid unusually saturated with alum. In fact, the water thus used is water which has been several times employed on successive charges of clay. About one-tenth ($\frac{1}{10}$) of the water is fresh, pumped from a well in as pure a condition as possible. The other nine-tenths ($\frac{9}{10}$) is water which has been subjected to one or more circuits through the apparatus. The small stream of fresh water is introduced at the second washing—none at the first washing. It follows that the clay stands in soak in the most concentrated solution of alum. I believe that this acts chemically, by virtue of the free sulphuric acid contained therein, or otherwise, to dissolve the iron. Other chemicals can be added if it shall be found expedient; but I have found the alum in the clay from Woodbridge, New Jersey, and the corresponding clay in the vicinity sufficient, with the mechanical action, to effect the complete removal of the iron.

At the end of the operation the clay has been washed in a water which has received its installment of fresh, and the water down to nearly the last traces is removed, not by evaporation, but by compression in bags. So little dampness is left in the clay after the compression that practically all the soluble material, including the sulphate of iron, is removed. Chemicals must be added cautiously, if at all, or they are liable to injure the fabric in the subsequent expressing of the water.

Modifications may be made in many of the details. I can effect the first washing without the preliminary soaking. I can wash two or more times with a soaking after each before the final washing. I can lawn or screen the clay at any desired stage to remove light impurities.

It will be understood that my process does not prevent the additional use of any other. The clay may be treated before, afterward, or at intermediate stages by any other process which may tend to improve the clay or promote the adaptation of the clay to any special use. The clay I have treated—heavy-bodied Woodbridge fine clay—was pumped up from the base of the settling-tanks and compressed in a press which I have invented, and which is set forth in the patent issued to me July 29, 1879, No. 218,058.

I have made but one grade of clay—a uniformly good clay—and the ware therefrom is unusually free from local or general faults or discoloration. It is especially free from what are known as "specks," which the ordinary washing does not remove. The ware is stronger than ware from the same clay as heretofore treated.

"Washing" by the peculiarly efficient apparatus ordinarily used in that process, technically so called, is eminently adapted to serve for the fine separation of the clay preliminary to my soaking, which latter I prefer, as before stated, to effect in a creamy condition, so that the foreign material is not likely to sink at this stage; but I believe it practicable to attain the preliminary creamy condition by other means than washing. It is only essential that it shall be such a thorough treatment as shall soak a part and thoroughly disintegrate all of the clay except that immediately around the particles of foreign matter. Nothing but what is technically known as "washing" can suffice, in my judgment, for the second and final washing.

For fire-brick the ordinary large proportion of coarser refractory clay may be worked with a small proportion of fine clay refined by my process, and in such case the excess of water in my clay, as it comes from the bottom of the settling-tanks, will not be too great for direct mingling with the dry coarser clays in the pit, and thus allow the kneading and molding of the clays together without further treatment.

Parts of the invention may be used without the whole. I can use the method successfully by concentrating the resulting clay by evaporation instead of decanting and pressing; but I esteem the latter far preferable, because it removes all the soluble matter carried by the water.

I claim as my invention—

1. In the preparatory treatment of potters' clay, the process of reserving a portion of the water discharged from the clay at the termination, and employing it in the earlier stages of the washing of a subsequent batch of clay, as and for the purposes herein specified.

2. In the preparatory treatment of potters' clay, causing the clay to remain a long time finely divided in a thin fluid containing alum or other desired chemicals, subsequently adding liberal quantities of water, part or all of which is fresh, and separating by decantation and pressure, so as to remove the solid impurities by both mechanical and chemical action, as herein specified.

In testimony whereof I have hereunto set my hand, at Perth Amboy, this 23d day of July, 1880, in the presence of two subscribing witnesses.

SIMEON G. PHILLIPS.

Witnesses:
 ISAAC D. WARD,
 I. THOM GOLDING.